(12) United States Patent
Xu et al.

(10) Patent No.: US 10,966,231 B2
(45) Date of Patent: Mar. 30, 2021

(54) CONFIGURING AGGREGATION LEVEL AND PHYSICAL DOWNLINK CONTROL CHANNEL CANDIDATES AT A USER EQUIPMENT

(71) Applicant: QUALCOMM Incorporated, San Diego, CA (US)

(72) Inventors: Huilin Xu, San Diego, CA (US); Ying Wang, San Diego, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 6 days.

(21) Appl. No.: 16/583,873

(22) Filed: Sep. 26, 2019

(65) Prior Publication Data

US 2020/0107344 A1    Apr. 2, 2020

Related U.S. Application Data

(60) Provisional application No. 62/738,886, filed on Sep. 28, 2018.

(51) Int. Cl.
*H04W 72/12* (2009.01)
*H04W 68/00* (2009.01)
(Continued)

(52) U.S. Cl.
CPC ..... *H04W 72/1273* (2013.01); *H04W 64/003* (2013.01); *H04W 68/005* (2013.01); *H04W 76/27* (2018.02)

(58) Field of Classification Search
CPC ..... H04L 5/0053; H04L 5/0007; H04L 5/001; H04L 5/0037; H04L 27/5656;
(Continued)

(56) References Cited

U.S. PATENT DOCUMENTS 8,995,376 B2 * 3/2015 Pan ............. H04W 52/146
370/329
2017/0230994 A1    8/2017 You et al.
2018/0227156 A1    8/2018 Papasakellariou

FOREIGN PATENT DOCUMENTS

WO    2018127802 A1    7/2018

OTHER PUBLICATIONS

International Search Report and Written Opinion—PCT/US2019/053498—ISA/EPO—dated Dec. 16, 2019.

* cited by examiner

*Primary Examiner* — Chandrahas B Patel
(74) *Attorney, Agent, or Firm* — Harrity & Harrity, LLP

(57) ABSTRACT

Various aspects of the present disclosure generally relate to wireless communication. In some aspects, a user equipment (UE) may receive a first search space set, and may identify, based at least in part on the first search space set, physical downlink shared channel (PDSCH) schedule information included in a first physical downlink control channel (PDCCH) received from a base station (BS). The UE may identify, based at least in part on the PDSCH schedule information, a second search space set included in a PDSCH received from the BS. The second search space set may include information identifying an aggregation level (AL) and one or more PDCCH candidate locations that are associated with the AL. The UE may configure, based at least in part on the AL and the one or more PDCCH candidate locations, the UE to identify a second PDCCH transmitted from the BS. Numerous other aspects are provided.

30 Claims, 11 Drawing Sheets

(51) Int. Cl.
*H04W 76/27* (2018.01)
*H04W 64/00* (2009.01)

(58) Field of Classification Search
CPC . H04W 72/042; H04W 52/146; H04W 52/34; H04B 7/155; H04B 7/2606
See application file for complete search history.

CONFIGURING AGGREGATION LEVEL AND PHYSICAL DOWNLINK CONTROL CHANNEL CANDIDATES AT A USER EQUIPMENT

CROSS-REFERENCE TO RELATED APPLICATION

This application claims priority to Provisional Application No. 62/738,886, filed on Sep. 28, 2018, entitled "CONFIGURING AGGREGATION LEVEL AND PHYSICAL DOWNLINK CONTROL CHANNEL CANDIDATES AT A USER EQUIPMENT," which is hereby expressly incorporated by reference herein.

FIELD OF THE DISCLOSURE

Aspects of the present disclosure generally relate to wireless communication, and more particularly to techniques and apparatuses for configuring aggregation level and physical downlink control channel candidates at a user equipment.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment, may include receiving, from a base station, a first search space set. The method may include identifying, based at least in part on the first search space set, physical downlink shared channel (PDSCH) schedule information included in a first physical downlink control channel (PDCCH) received from the base station. The method may include identifying, based at least in part on the PDSCH schedule information, a second search space set included in a PDSCH received from the base station, wherein the second search space set includes information identifying an aggregation level and one or more PDCCH candidate locations that are associated with the aggregation level. The method may include configuring, based at least in part on the aggregation level and the one or more PDCCH candidate locations, the user equipment to identify a second PDCCH transmitted from the base station.

In some aspects, a user equipment for wireless communication may include memory and one or more processors operatively coupled to the memory. The memory and the one or more processors may be configured to receive, from a base station, a first search space set. The memory and the one or more processors may be configured to identify, based at least in part on the first search space set, (PDSCH schedule information included in a first PDCCH received from the base station. The memory and the one or more processors may be configured to identify, based at least in part on the PDSCH schedule information, a second search space set included in a PDSCH received from the base station, wherein the second search space set includes information identifying an aggregation level and one or more PDCCH candidate locations that are associated with the aggregation level. The memory and the one or more processors may be configured to configure, based at least in part on the aggregation level and the one or more PDCCH candidate locations, the user equipment to identify a second PDCCH transmitted from the base station.

In some aspects, a non-transitory computer-readable medium may store one or more instructions for wireless communication. The one or more instructions, when executed by one or more processors of a user equipment, may cause the one or more processors to receive, from a base station, a first search space set. The one or more instructions, when executed by one or more processors, may cause the one or more processors to identify, based at least in part on the first search space set, PDSCH schedule information included in a first PDCCH received from the base station. The one or more instructions, when executed by one or more processors, may cause the one or more processors to identify, based at least in part on the PDSCH schedule information, a second search space set included in a PDSCH received from the base station, wherein the second search space set includes information identifying an aggregation level and one or more PDCCH candidate locations that are associated with the aggregation level. The one or more instructions, when executed by one or more processors, may cause the one or more processors to configure, based at least in part on the aggregation level and the one or more PDCCH candidate locations, the user equipment to identify a second PDCCH transmitted from the base station.

In some aspects, an apparatus for wireless communication may include means for receiving, from a base station, a first search space set. The apparatus may include means for identifying, based at least in part on the first search space set, PDSCH schedule information included in a first PDCCH received from the base station. The apparatus may include means for identifying, based at least in part on the PDSCH schedule information, a second search space set included in a PDSCH received from the base station, wherein the second search space set includes information identifying an aggregation level and one or more PDCCH candidate locations that are associated with the aggregation level. The apparatus may include means for configuring, based at least in part on the aggregation level and the one or more PDCCH candidate locations, the apparatus to identify a second PDCCH transmitted from the base station.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
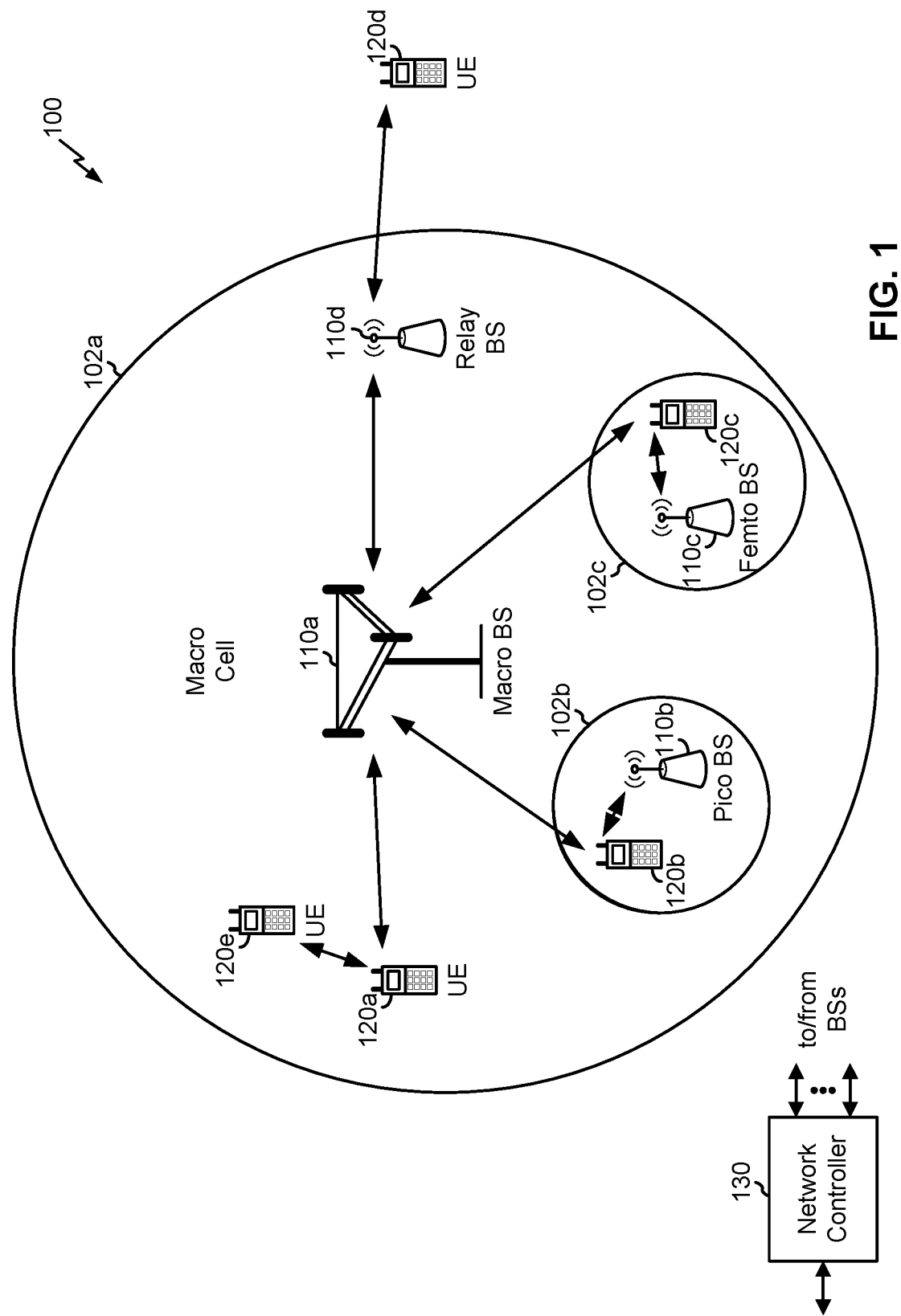
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
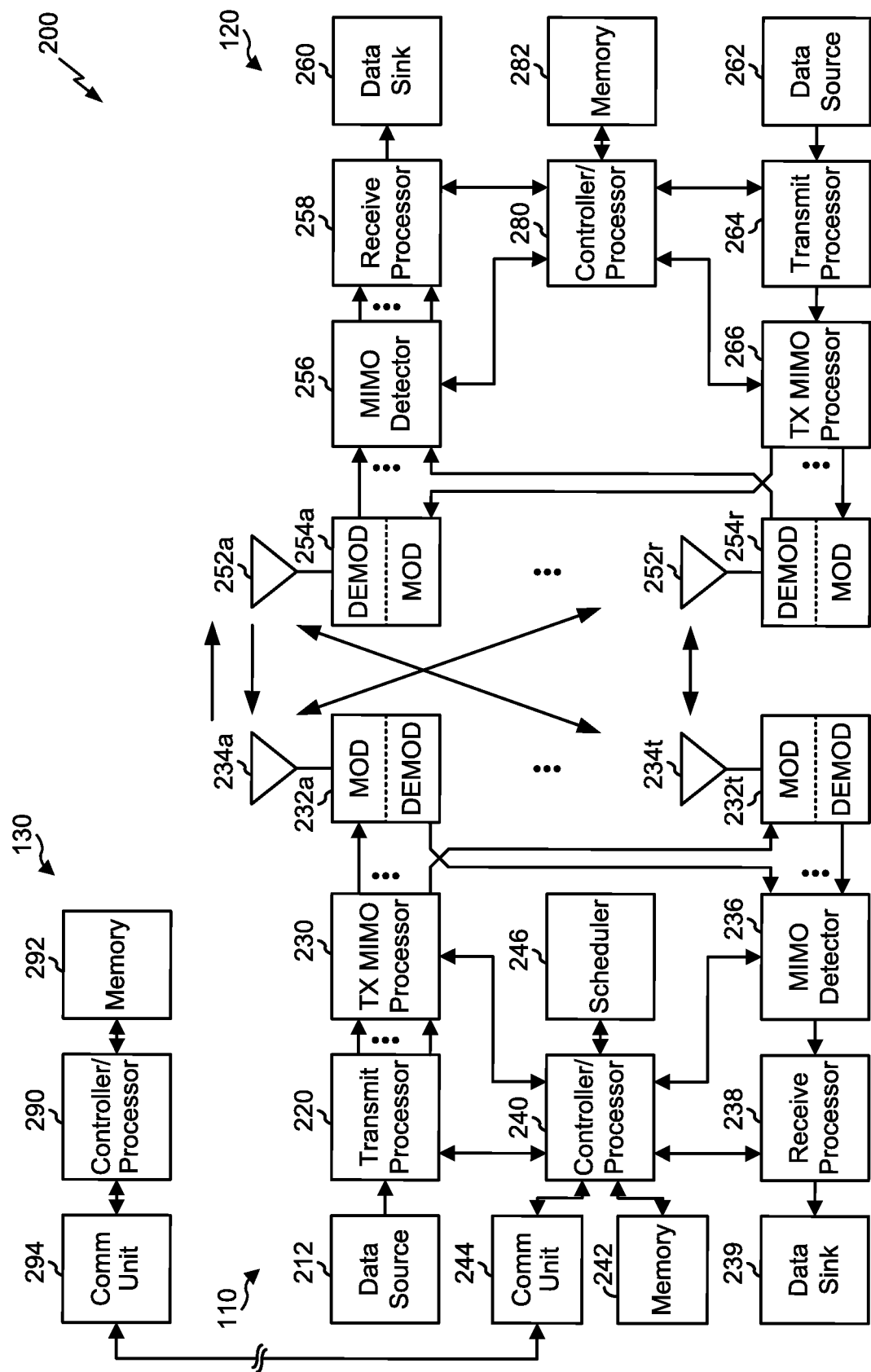
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with configuring aggregation level and physical downlink control channel candidates at a user equipment, as described in more detail elsewhere herein. For example, controller/processor 240 of base station 110, controller/processor 280 of UE 120, and/or any other component(s) of FIG. 2 may perform or direct operations of, for example, process 900 of FIG. 9, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving, from a base station, a first search space set, means for identifying, based at least in part on the first search space set, physical downlink shared channel (PDSCH) schedule information included in a first physical downlink control channel (PDCCH) received from the base station, means for identifying, based at least in part on the PDSCH schedule information, a second search space set included in a PDSCH received from the base station, wherein the second search space set includes information identifying an aggregation level and one or more PDCCH candidate locations that are associated with the aggregation level, means for configuring, based at least in part on the aggregation level and the one or more PDCCH candidate locations, the UE to identify a second PDCCH transmitted from the base station, and/or the like. In some aspects, such means may include one or more components of UE 120 described in connection with FIG. 2.

As indicated above, FIG. 2 is provided merely as an example. Other examples may differ from what is described with regard to FIG. 2.

Figure 3A:
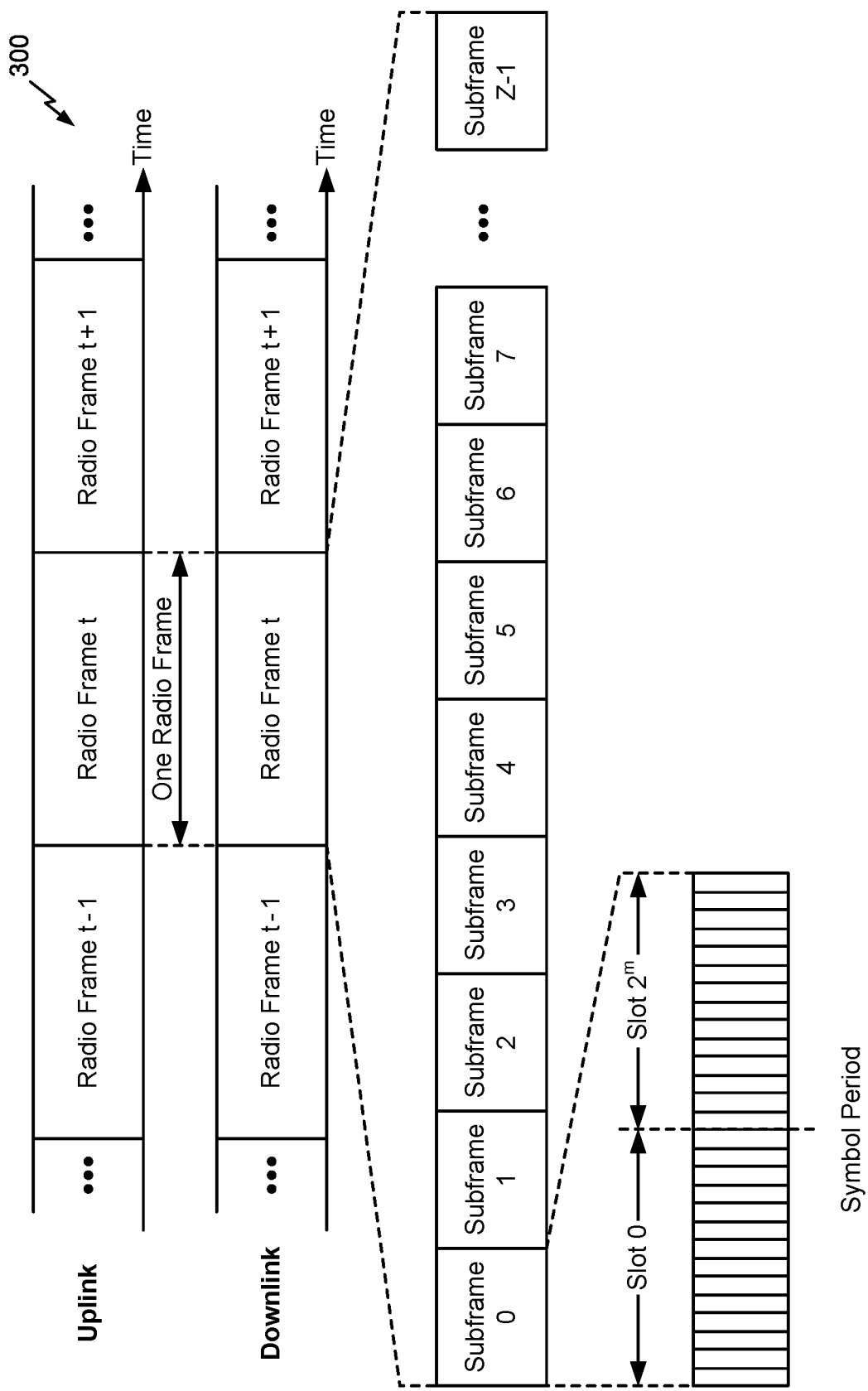
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
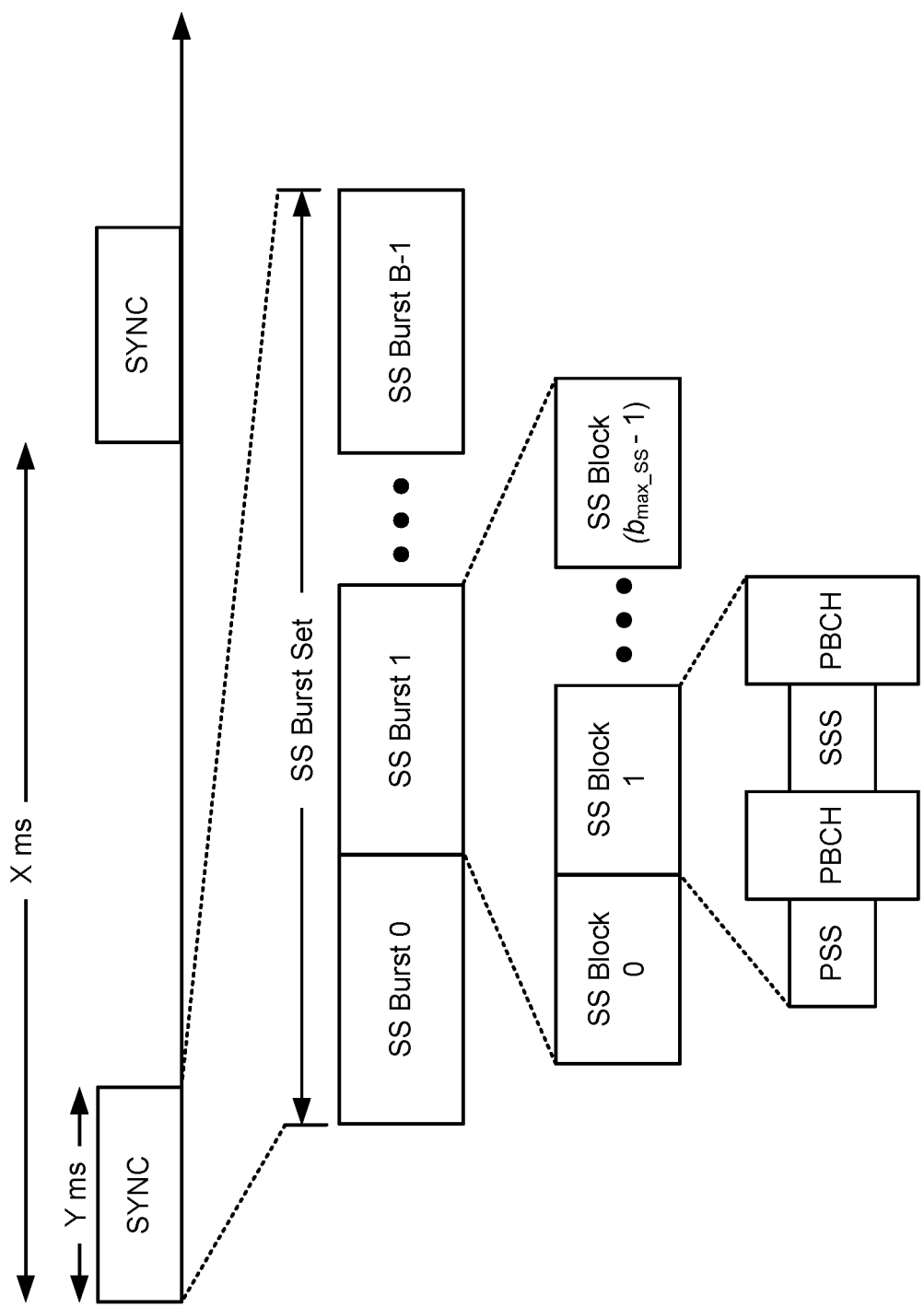
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}$−1), where $b_{max\_SS}$−1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a PDSCH in certain slots. The base station may transmit control information/data on a physical PDCCH in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
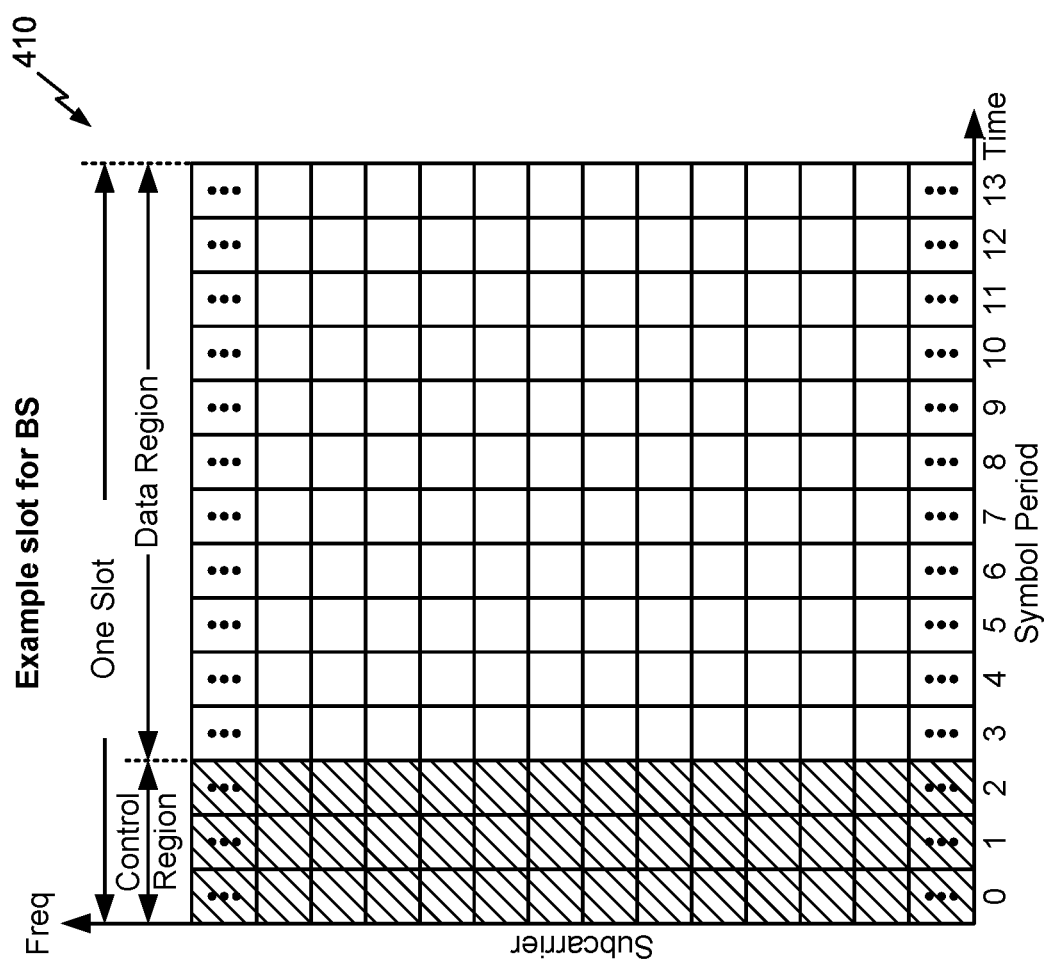
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
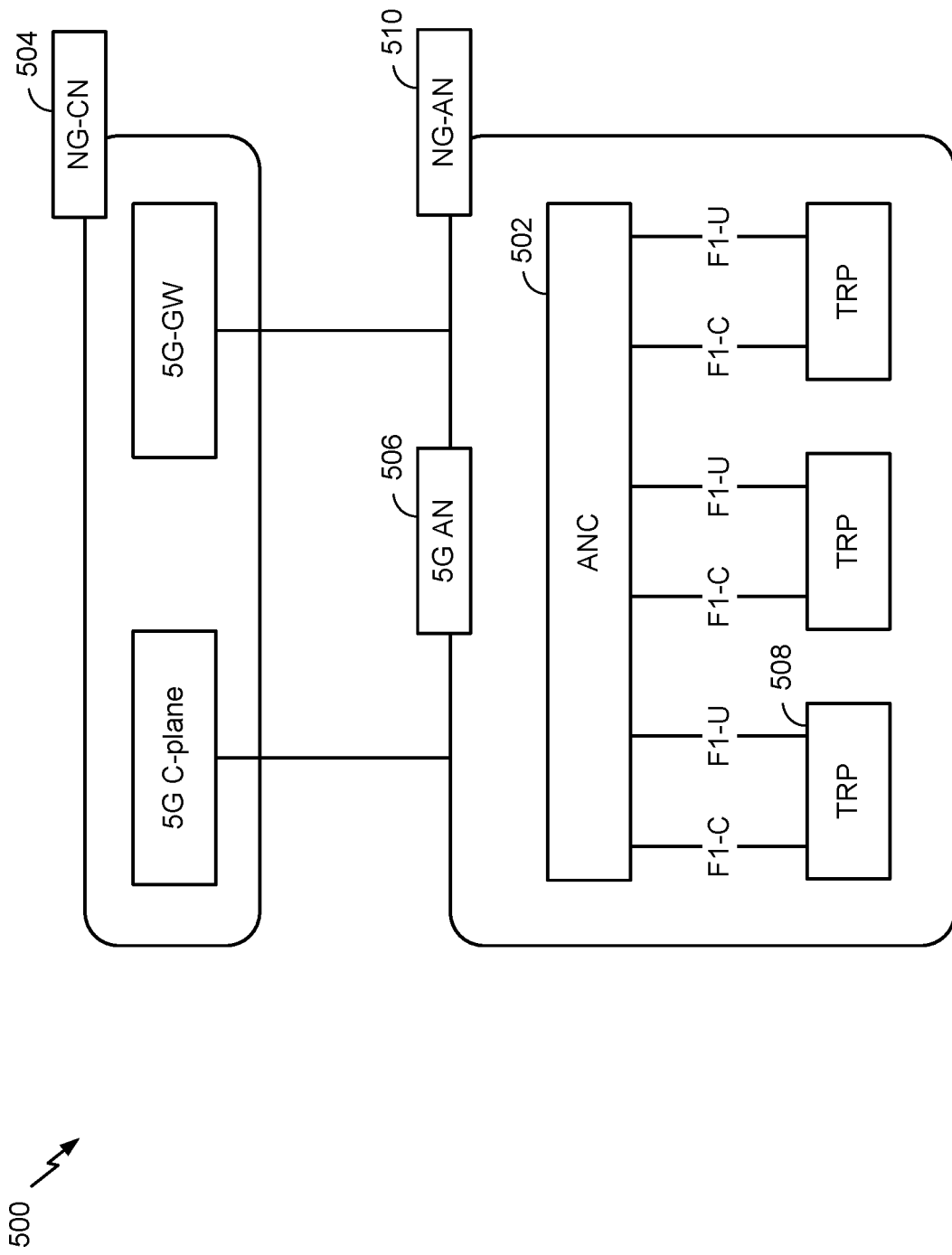
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples may differ from what is described with regard to FIG. 5.

Figure 6:
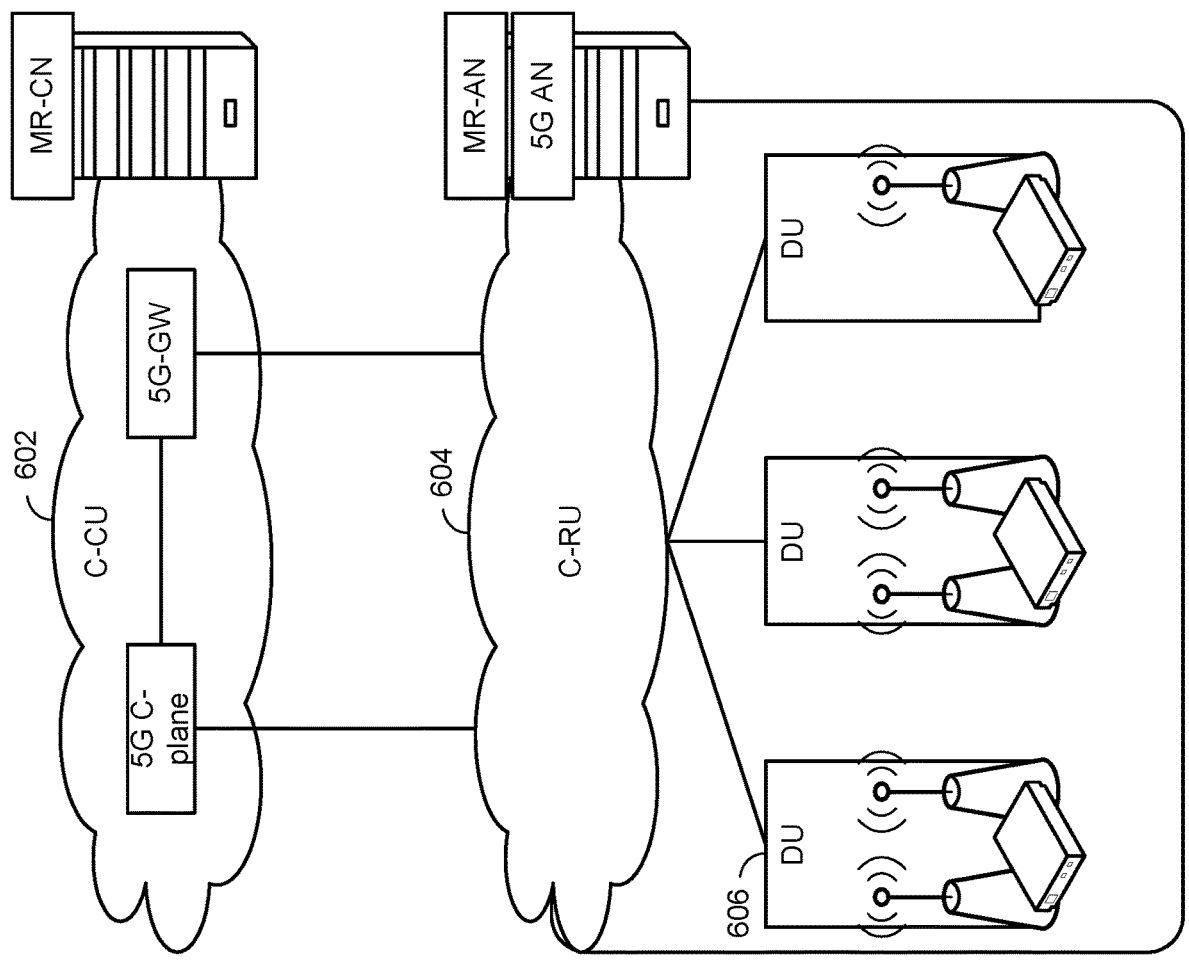
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples may differ from what is described with regard to FIG. 6.

Figure 7:
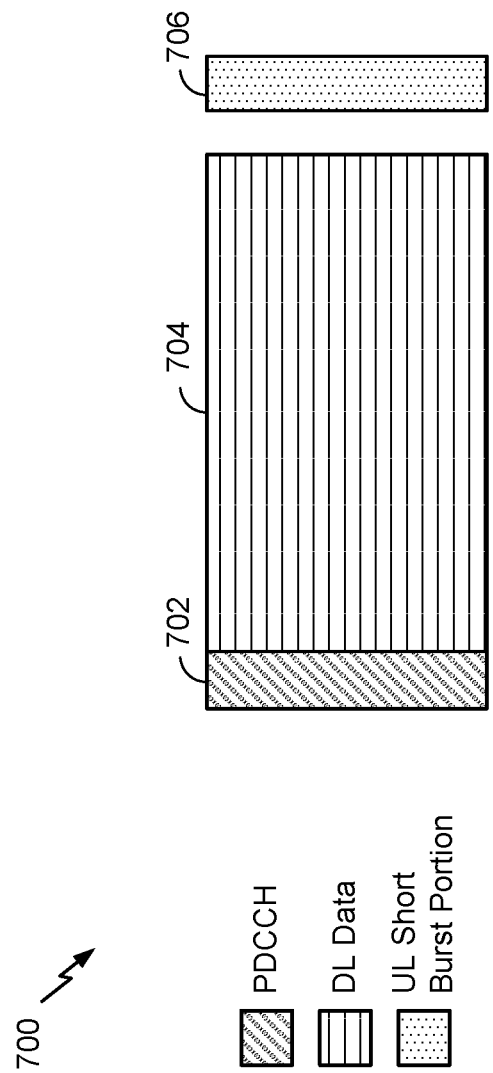
FIG. 7 is a diagram illustrating an example of a downlink (DL)-centric slot, in accordance with various aspects of the present disclosure.

FIG. 7 is a diagram 700 showing an example of a DL-centric slot or wireless communication structure. The DL-centric slot may include a control portion 702. The control portion 702 may exist in the initial or beginning portion of the DL-centric slot. The control portion 702 may include various scheduling information and/or control information corresponding to various portions of the DL-centric slot. In some configurations, the control portion 702 may be a PDCCH, as indicated in FIG. 7. In some aspects, the control portion 702 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, and/or the like), and/or the like. For example, the control portion 702 may include schedule information associated with a DL data portion 704, which may identify one or more subframes, one or more resource blocks, one or more resource elements, and/or the like, of the DL-centric wireless communication structure, that are to be used to transmit the DL data portion 704.

The DL-centric slot may also include a DL data portion 704. The DL data portion 704 may sometimes be referred to as the payload of the DL-centric slot. The DL data portion 704 may include the communication resources utilized to communicate DL data from the scheduling entity (e.g., UE or BS) to the subordinate entity (e.g., UE). For example, the DL data portion 704 may include information such as a system information block (SIB), other system information (OSI), paging information, and/or the like. In some configurations, the DL data portion 704 may be a PDSCH.

The DL-centric slot may also include an UL short burst portion 706. The UL short burst portion 706 may sometimes be referred to as an UL burst, an UL burst portion, a common UL burst, a short burst, an UL short burst, a common UL short burst, a common UL short burst portion, and/or various other suitable terms. In some aspects, the UL short burst portion 706 may include one or more reference signals. Additionally, or alternatively, the UL short burst portion 706 may include feedback information corresponding to various other portions of the DL-centric slot. For example, the UL short burst portion 706 may include feedback information corresponding to the control portion 702 and/or the DL data portion 704. Non-limiting examples of information that may be included in the UL short burst portion 706 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 706 may include additional or alternative information, such as information pertaining to random access channel (RACH) procedures, scheduling requests, and various other suitable types of information.

As illustrated in FIG. 7, the end of the DL data portion 704 may be separated in time from the beginning of the UL short burst portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 7 is provided merely as an example. Other examples may differ from what is described with regard to FIG. 7.

In a wireless network, a base station may transmit, to a user equipment, system information, such as system information blocks (SIBs), other system information (OSI), paging communications, and/or the like. The base station may transmit the system information to the user equipment in a PDSCH. In some cases, the PDSCH that carries the system information may be located in one or more subframes, slots, resource blocks, resource elements, and/or the like, of a downlink of a wireless communication link between the base station and the user equipment.

The base station may transmit, to the user equipment, PDSCH schedule information so that the user equipment may locate the PDSCH that carries the system information based at least in part on the PDSCH schedule information. In some cases, the base station may transmit the PDSCH schedule information in a PDCCH. The base station may transmit the PDCCH carrying the PDSCH schedule information in one or more PDCCH candidate locations included in the downlink. The user equipment may decode the one or more PDCCH candidate locations to identify the PDSCH schedule information.

In some cases, the one or more PDCCH candidate locations may be one or more default PDCCH candidate locations that are specified by a default aggregation level (e.g., one or more PDCCH candidate locations that are not explicitly specified by the base station and are instead used as standard PDCCH candidate locations in the wireless network). The base station may transmit, to the user equipment, a default control resource set (CORESET) and a default search space set, the combination of which may implicitly signal to the user equipment to use the default aggregation level and associated default PDCCH candidate locations to identify the PDSCH schedule information. While the use of the default aggregation level and associated default PDCCH candidate locations may consume a relatively small amount of downlink overhead, the default aggregation level and associated default PDCCH candidate locations provide little flexibility in transmitting PDSCH schedule information in a PDCCH. As a result, the default aggregation level and associated default PDCCH candidate locations may not allow the base station and/or user equipment to fully use the radio resources available on the downlink, which reduces throughput on the downlink, reduces efficiency of radio resource usage on the downlink, reduces flexibility of scheduling PDCCH communications, and/or the like.

Some aspects described herein provide techniques and apparatuses for configuring aggregation level and physical downlink control channel candidates at the user equipment. In some aspects, a base station may transmit, to a user equipment, a first search space set. The first search space set may include a default search space set that is associated with a default aggregation level and one or more default PDCCH candidate locations. The user equipment may identify, based at least in part on the first search space set, PDSCH schedule information included in a first PDCCH received from the base station. The user equipment may identify, based at least in part on the PDSCH schedule information, a second search space set included in a PDSCH received from the base station. The second search space set may include information that explicitly identifies a specific aggregation level and one or more specific PDCCH candidate locations. In this way, the user equipment may use the specific aggregation level and the one or more specific PDCCH candidate locations, explicitly identified in the second search space set, to identify a second PDCCH transmitted from the base station. This allows the base station and/or another device included in the wireless network to more flexibly configure PDCCH communications, which allows the base station and/or the user equipment to fully use the radio resources available on the downlink of the wireless communication link between the base station and the user equipment, which increases throughput on the downlink, increases efficiency of radio resource usage on the downlink, and increases flexibility of scheduling PDCCH communications, and/or the like.

Figure 8A:
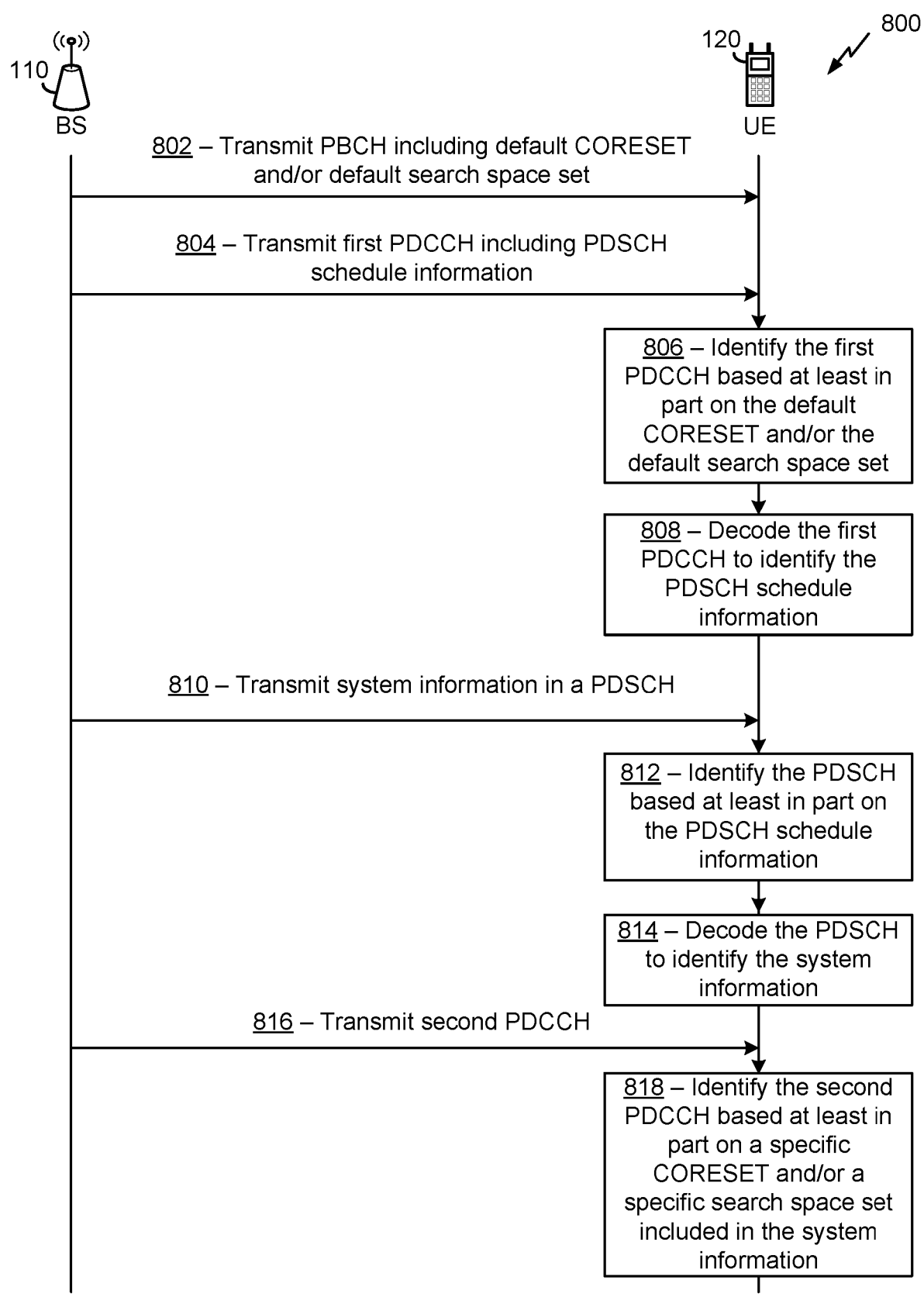
FIGS. 8A and 8B are diagrams illustrating an example of configuring aggregation level and physical downlink control channel candidates at a UE, in accordance with various aspects of the present disclosure.
Figure 8B:
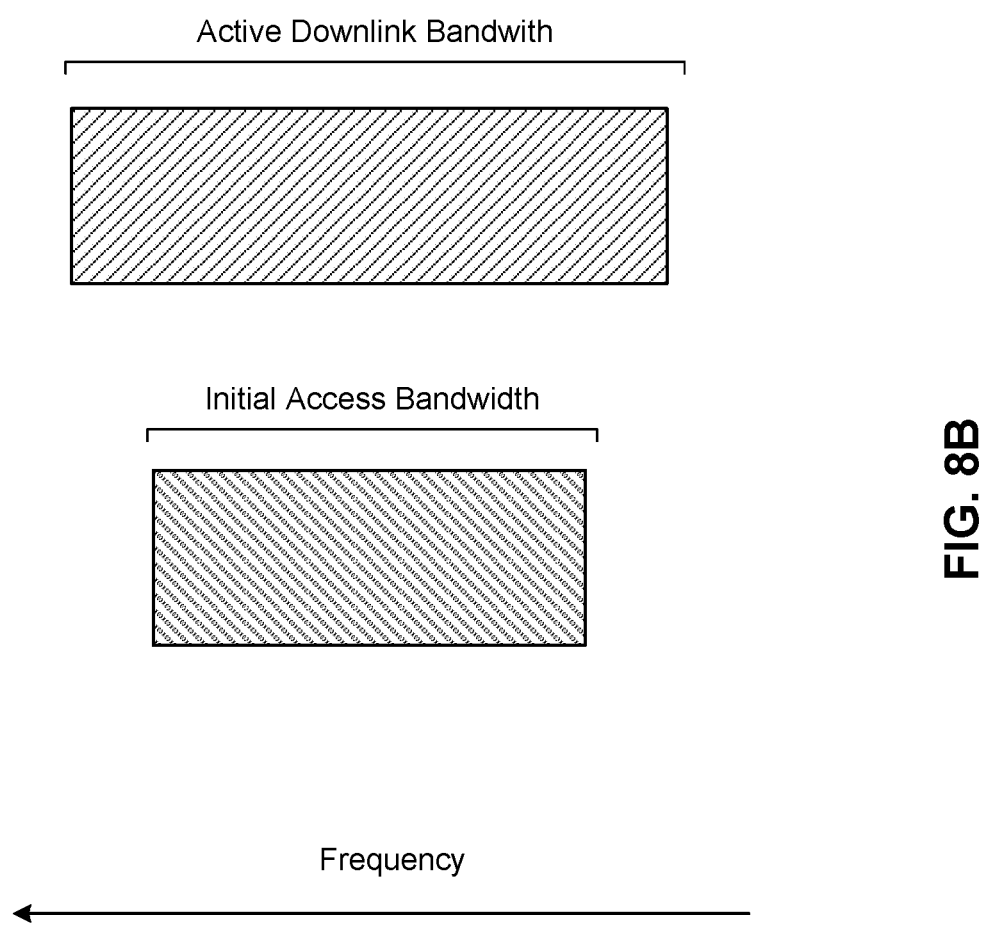

FIGS. 8A and 8B are diagrams illustrating an example 800 of configuring aggregation level and physical downlink control channel candidates at a user equipment, in accordance with various aspects of the present disclosure. As shown in FIG. 8A, example 800 may include a base station (e.g., BS 110) and a user equipment (e.g., UE 120). In some aspects, BS 110 and UE 120 may be included in a wireless network and may be communicatively connected via a wireless communication link. The wireless communication link may include a downlink and an uplink. The downlink may include a downlink control portion and a downlink data portion. In some aspects, BS 110 may transmit, to UE 120, system information, such as system information blocks (SIBs), other system information (OSI), paging communications, and/or the like, in a PDSCH in the downlink data portion of the downlink. BS 110 may transmit, to UE 120, PDSCH schedule information that configures UE 120 to identify the PDSCH carrying the system information. BS 110 may transmit the control signaling information in the downlink control portion of the downlink.

As shown in FIG. 8A, and by reference number 802, to transmit PDSCH schedule information to UE 120, BS 110 may transmit a default CORESET and/or a default search space set on a physical broadcast channel (PBCH) on the downlink. BS 110 may transmit the default CORESET and/or the default search space set in a master information block (MIB) communication on the PBCH. In some aspects, BS 110 may transmit the PBCH to UE 120 based at least in part on UE 120 communicatively connecting to BS 110. While BS 110 and UE 120 are establishing the connection, the available bandwidth on the downlink between BS 110 and UE 120 may be relatively small. As a result, the PBCH may be configured to transmit a relatively small amount of information. Accordingly, BS 110 may transmit the default CORESET and/or the default search space set on the PBCH due to the default CORESET and/or the default search space set consuming a relatively small amount of downlink resources (e.g., four OFDMA symbols of a particular slot). The default CORESET may be assigned a CORESET identifier of 0 or any other CORESET identifier. The default search space set may be assigned a search space set identifier of 0 or any other search space set identifier.

In some aspects, a CORESET may correspond to a PDCCH structure of a PDCCH that BS 110 may transmit to UE 120 in the downlink control portion of the downlink. The structure may include a bandwidth of the PDCCH and a time duration of the PDCCH. The bandwidth may include information identifying one or more frequency carriers, one or more subcarriers, and/or the like. The time duration may include information identifying a quantity of symbols, a quantity of slots, a quantity of subframes, and/or the like.

In some aspects, a search space set may correspond to one or more PDCCH candidate locations, in the time domain of the downlink control portion, at which a PDCCH may be located. The one or more PDCCH candidate locations may be specified in one or more symbols, one or more slots, one or more subframes, one or more control channel elements, and/or the like. A search space set may specify an aggregation level, which may be configured to correspond to a particular quantity of PDCCH candidate locations. For example, an aggregation level n may correspond to a quantity m of PDCCH candidate locations.

In some aspects, the default CORESET and the default search space set may be a standard CORESET and a standard search space set that is configured for the wireless network. In this way, when a user equipment (e.g., UE 120) initially connects to a base station (e.g., BS 110) in the wireless network, the base station may initially configure the user equipment with the default CORESET and default search space set. The default CORESET may implicitly correspond to a default PDCCH structure for the wireless network, and the default search space set may implicitly correspond to a default aggregation level for the wireless network. The default aggregation level may correspond to one or more default PDCCH candidate locations for the wireless network.

As further shown in FIG. 8A, and by reference number 804, BS 110 may transmit a first PDCCH to UE 120. For example, BS 110 may transmit the first PDCCH to UE 120 based at least in part on a PDCCH transmission schedule (e.g., a periodic transmission schedule, a semi-persistent transmission schedule, and/or the like), based at least in part on an event (e.g., based at least in part on receiving a communication from UE 120), and/or the like.

BS 110 may transmit the first PDCCH in a particular PDCCH candidate location, of the one or more default PDCCH candidate locations, included in the downlink control portion of the downlink. In some aspects, the first PDCCH may include PDSCH schedule information. The PDSCH schedule information may include time domain information that specifies one or more locations, in the time domain of the downlink data portion, at which system information may be transmitted in a PDSCH to UE 120. The one or more locations may be specified in one or more symbols, one or more slots, one or more subframes, one or more control channel elements, and/or the like.

The system information may include a system information block 1 (SIB1) communication, may include an other system information (OSI) communication (e.g., (e.g., a SIB2 communication, a SIB3 communication, a radio resource control (RRC) communication, and/or the like), may include a paging communication, and/or the like. In some aspects, the SIB1 communication may include information identifying one or more access parameters associated with BS 110 (e.g., information specifying whether a user equipment (e.g., UE 120) may access BS 110), may include information identifying a specific CORESET, may include information identifying a specific search space set, and/or the like. A specific CORESET, unlike the default CORESET, may include information explicitly specifying a structure of a PDCCH that BS 110 may transmit to UE 120 in the downlink control portion of the downlink. Similarly, a specific search space set, unlike the default search space set, may include information explicitly specifying an aggregation level and/or one or more PDCCH candidate locations at which a PDCCH may be transmitted. In this way, BS 110 may flexibly configure a specific CORESET and/or a specific search space set such that BS 110 may more efficiently use the available bandwidth on the downlink to transmit PDCCH communications. In some aspects, BS 110 may include the specific CORESET and/or the specific search space set in an RRC communication instead of, or in addition to, the SIB1 communication.

As further shown in FIG. 8A, and as shown by reference number 806, UE 120 may identify, based at least in part on the default CORESET and/or the default search space set, the first PDCCH, in a PDSCH candidate location, included the downlink control portion of the downlink. In some aspects, UE 120 may be provisioned (e.g., by an operator of the wireless network, by a vendor of UE 120, by BS 110, and/or the like) with information that associates the default CORESET with the default PDCCH structure, with information that associates the default search space set with the one or more default PDCCH candidate locations, and/or the like. Accordingly, UE 120 may monitor the one or more default PDCCH candidate locations, associated with the default search space set, to identify a PDCCH having the default PDCCH structure associated with the default CORESET.

As further shown in FIG. 8A, and as shown by reference number 808, UE 120 may decode the first PDCCH to identify the PDSCH schedule information. For example, UE 120 may decode the first PDCCH, based at least in part on a modulation scheme used in the wireless network (e.g., a downlink modulation scheme and/or the like). For example, UE 120 may demodulate one or more frequencies, used to transmit the first PDCCH, using one or more demodulation techniques associated with the modulation scheme used in the wireless network.

As further shown in FIG. 8A, and as shown by reference number 810, BS 110 may transmit, to UE 120, system information on a PDSCH in the downlink data portion of the downlink. For example, BS 110 may transmit the PDSCH to UE 120 based at least in part on a PDSCH transmission schedule (e.g., a periodic transmission schedule, a semi-persistent transmission schedule, and/or the like), based at least in part on an event (e.g., based at least in part on receiving a communication from UE 120), based at least in part on transmitting the first PDCCH to UE 120, and/or the like. BS 110 may transmit the PDSCH, in a location in the downlink data portion of the downlink, based at least in part on the PDSCH schedule information. For example, BS 110 may transmit the PDSCH in one or more locations, in the time domain of the downlink data portion, specified in the PDSCH schedule information.

As further shown in FIG. 8A, and as shown by reference number 812, UE 120 may identify the PDSCH based at least in part on the PDSCH schedule information. As explained above, PDSCH schedule information may include time domain information that specifies one or more locations, in the time domain of the downlink data portion, at which system information may be transmitted in a PDSCH to UE 120. Accordingly, UE 120 may identify the PDSCH by monitoring the one or more locations specified in the PDSCH schedule information.

As further shown in FIG. 8A, and as shown by reference number 814, UE 120 may decode the PDSCH to identify the system information. For example, UE 120 may decode the PDSCH, based at least in part on a modulation scheme used in the wireless network (e.g., a downlink modulation scheme and/or the like). For example, UE 120 may demodulate one or more frequencies, used to transmit the PDSCH, using one or more demodulation techniques associated with the modulation scheme used in the wireless network.

As explained above, the system information may include a SIB1 communication, may include an OSI communication, such as an RRC communication, may include a paging communication, and/or the like. In some aspects, the SIB1 communication and/or the RRC communication may include a specific CORESET and/or a specific search space set. The specific CORESET may include information that explicitly specifies a specific PDCCH structure of a second PDCCH that is to be transmitted by BS 110. The specific search space set may include information that explicitly specifies a specific aggregation layer and associated one or more specific PDCCH candidate locations.

In some aspects, the specific PDCCH structure and the default PDCCH structure may overlap (e.g., fully overlap, partially overlap, and/or the like), the specific aggregation level and the default aggregation level may overlap (e.g., fully overlap, partially overlap, and/or the like), and/or the like. In this case, BS 110 may identify the specific CORESET and specific search space set, in the SIB1 communication and/or the RRC communication, as a duplicate of the default CORESET and the default search space set, as a reference to the default CORESET and the default search space set, and/or the like. This may occur, for example, where BS 110 configures UE 120 to use the default CORESET and the default search space set, that are indicated by the MIB for PDCCH monitoring for SIB1, OSI, and/or paging if the active downlink bandwidth part (BWP) of UE 120 fully overlaps with the bandwidth for initial access, as illustrated in FIG. 8B. In some aspects, BS 110 may further specify that the downlink BWP is to have a subcarrier spacing the same as the subcarrier spacing for the bandwidth that is used for initial access.

As further shown in FIG. 8A, and as shown by reference number 816, BS 110 may transmit the second PDCCH to UE 120. For example, BS 110 may transmit the second PDCCH to UE 120 based at least in part on a PDCCH transmission schedule (e.g., a periodic transmission schedule, a semi-persistent transmission schedule, and/or the like), based at least in part on an event (e.g., based at least in part on receiving a communication from UE 120), based at least in part on transmitting the PDSCH to UE 120, and/or the like.

BS 110 may transmit the second PDCCH in a particular PDCCH candidate location of the one or more specific PDCCH candidate locations included in the downlink control portion of the downlink. In some aspects, the second PDCCH may include additional PDSCH schedule information, which may identify additional SIB1 communications, additional OSI communications, additional paging communications, and/or the like.

As further shown in FIG. 8A, and by reference number 818, UE 120 may identify, based at least in part on the specific CORESET and/or the specific search space set, the second PDCCH in a PDCCH candidate location included in the downlink control portion of the downlink. For example, UE 120 may monitor the one or more specific PDCCH candidate locations, associated with the specific search space set, to identify a PDCCH having the specific PDCCH structure associated with the specific CORESET. Accordingly, UE 120 may decode the second PDCCH to identify the additional PDSCH schedule information, may use the additional PDSCH schedule information to identify additional PDSCHs transmitted in the downlink data portion of the downlink, and/or the like.

In this way, UE 120 may use the specific aggregation level and associated one or more specific PDCCH candidate locations explicitly identified in the specific search space set, and/or may use the specific PDCCH structure explicitly identified in the specific CORESET, to identify PDCCHs transmitted from BS 110. This allows BS 110 and/or other devices included in the wireless network to more flexibly configure PDCCH communications, which allows BS 110 and/or UE 120 to fully use the radio resources available on the downlink of the wireless communication link between BS 110 and UE 120, which increases throughput on the downlink, increases efficiency of radio resource usage on the downlink, and increases flexibility of scheduling PDCCH communications, and/or the like.

As indicated above, FIGS. 8A and 8B are provided as an example. Other examples may differ from what is described with respect to FIGS. 8A and 8B.

Figure 9:
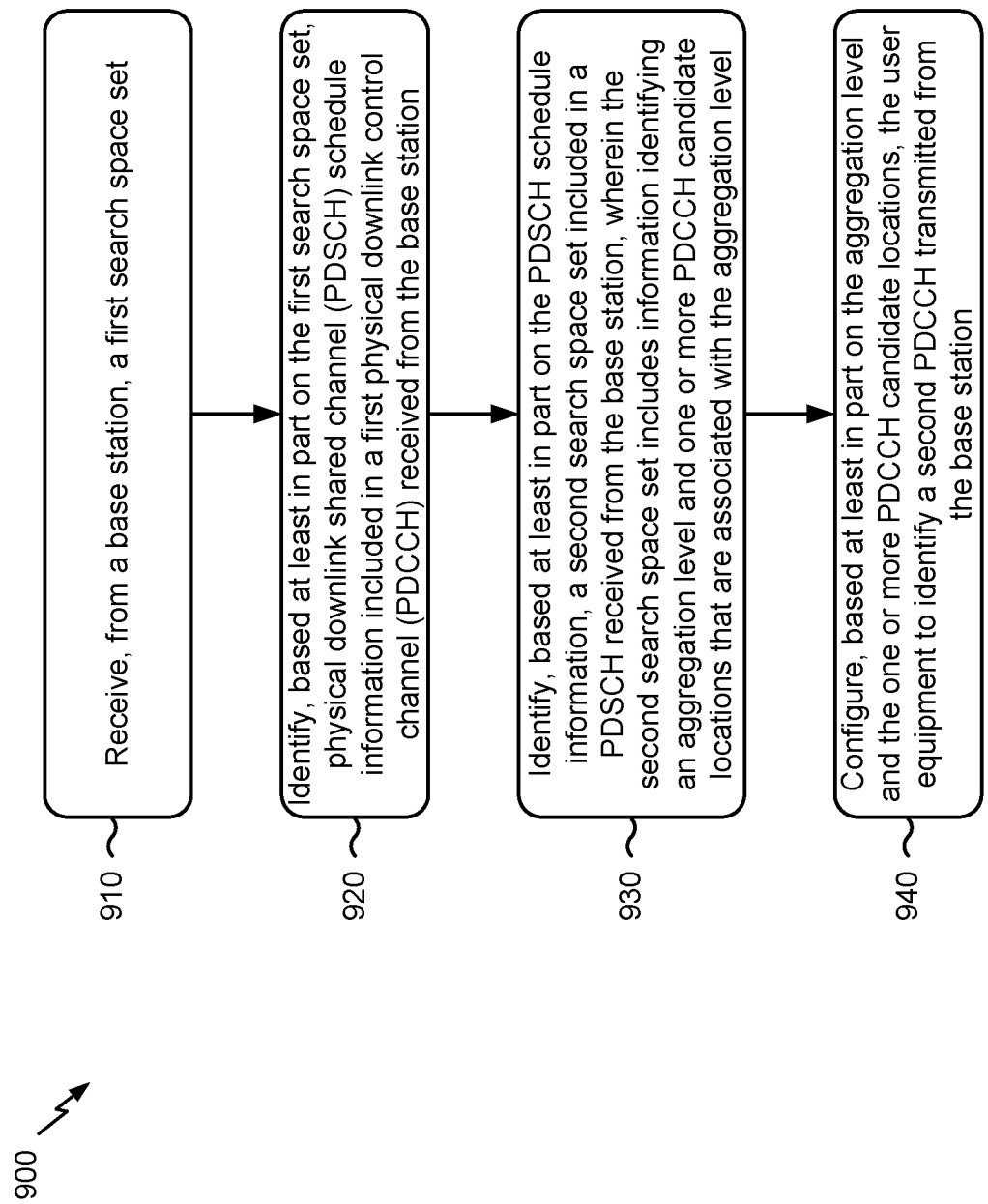
FIG. 9 is a diagram illustrating an example process performed, for example, by a UE, in accordance with various aspects of the present disclosure.

FIG. 9 is a diagram illustrating an example process 900 performed, for example, by a user equipment, in accordance with various aspects of the present disclosure. Example process 900 is an example where a user equipment (e.g., UE 120) performs configuring of aggregation level and physical downlink control channel candidates at the user equipment.

As shown in FIG. 9, in some aspects, process 900 may include receiving, from a base station, a first search space set (block 910). For example, the user equipment (e.g., using receive processor 258, controller processor 280, memory 282, and/or the like) may receive, from a base station, a first search space set, as described above.

As further shown in FIG. 9, in some aspects, process 900 may include identifying, based at least in part on the first search space set, PDSCH schedule information included in a first PDCCH received from the base station (block 920). For example, the user equipment (e.g., using receive processor 258, controller processor 280, memory 282, and/or the like) may identify, based at least in part on the first search space set, PDSCH schedule information included in a first PDCCH received from the base station, as described above.

As further shown in FIG. 9, in some aspects, process 900 may include identifying, based at least in part on the PDSCH schedule information, a second search space set included in a PDSCH received from the base station, wherein the second search space set includes information identifying an aggregation level and one or more PDCCH candidate locations that are associated with the aggregation level (block 930). For example, the user equipment (e.g., using receive processor 258, controller processor 280, memory 282, and/or the like) may identify, based at least in part on the PDSCH schedule information, a second search space set included in a PDSCH received from the base station, as described above. In some aspects, the second search space set includes information identifying an aggregation level and one or more PDCCH candidate locations that are associated with the aggregation level.

As further shown in FIG. 9, in some aspects, process 900 may include configuring, based at least in part on the aggregation level and the one or more PDCCH candidate locations, the user equipment to identify a second PDCCH transmitted from the base station (block 940). For example, the user equipment (e.g., using receive processor 258, controller processor 280, memory 282, and/or the like) may configure, based at least in part on the aggregation level and the one or more PDCCH candidate locations, the user equipment to identify a second PDCCH transmitted from the base station, as described above.

Process 900 may include additional aspects, such as any single aspect or any combination of aspects described below and/or in connection with one or more other processes described elsewhere herein.

In a first aspect, the first PDCCH is identified based at least in part on a default aggregation level associated with the first search space set, and one or more default PDCCH candidate locations associated with the default aggregation level. In a second aspect, alone or in combination with the first aspect, the aggregation level included in the second search space set comprises a specific aggregation level, associated with the second search space set, that is explicitly specified by the base station, and the one or more PDCCH candidate locations that are associated with the aggregation level comprise one or more specific PDCCH candidate locations, associated with the specific aggregation level, that are explicitly specified by the base station.

In a third aspect, alone or in combination with one or more of the first or second aspects, the second search space set is included in a radio resource configuration (RRC) communication transmitted in the PDSCH. In a fourth aspect, alone or in combination with one or more of the first through third aspects, the first search space set is included in master information block (MIB) communication, and the second PDCCH is identified, in the RRC communication, by at least one of a duplicate of the first search space set that is included in the MIB communication, or a reference to the first search space set that is included in the MIB communication. In a fifth aspect, alone or in combination with one or more of the first through fourth aspects, the reference to the first search space set comprises a search space set identifier of 0.

In a sixth aspect, alone or in combination with one or more of the first through fifth aspects, the duplicate of the first search space set comprises an explicit configuration that is the same as an implicit configuration of the first search space set that is included in the MIB communication. In a seventh aspect, alone or in combination with one or more of the first through sixth aspects, the second search space set is included in a system information block 1 (SIB1) communication transmitted in the PDSCH. In an eighth aspect, alone or in combination with one or more of the first through seventh aspects, the first search space set is included in master information block (MIB) communication, and the second PDCCH is identified, in the SIB1 communication, by at least one of a duplicate of the first search space set that is included in the MIB communication, or a reference to the first search space set that is included in the MIB communication.

In a ninth aspect, alone or in combination with one or more of the first through eighth aspects, the reference to the first search space set comprises a search space set identifier of 0. In a tenth aspect, alone or in combination with one or more of the first through ninth aspects, the duplicate of the first search space set comprises an explicit configuration that is the same as an implicit configuration of the first search space set that is included in the MIB communication. In an eleventh aspect, alone or in combination with one or more of the first through tenth aspects, the PDSCH schedule information comprises information identifying a first location, in the PDSCH, of a SIB1 communication transmitted in the PDSCH, a second location, in the PDSCH, of an OSI communication transmitted in the PDSCH, and a third location, in the PDSCH, of a paging communication transmitted in the PDSCH.

In a twelfth aspect, alone or in combination with one or more of the first through eleventh aspects, the first search space set is included in a MIB communication included in a PBCH. In a thirteenth aspect, alone or in combination with one or more of the first through twelfth aspects, the user equipment is configured to receive, from the base station, a CORESET associated with the first search space set, wherein the CORESET includes information identifying frequency information associated with the first PDCCH; and the user equipment, when identifying the PDSCH schedule information included in the first PDCCH, is configured to identify the PDSCH schedule information based at least in part on the frequency information associated with the first PDCCH.

In a fourteenth aspect, alone or in combination with one or more of the first through thirteenth aspects, the user equipment is configured to receive, from the base station, a CORESET associated with the second search space set, wherein the CORESET includes information identifying frequency information associated with the second PDCCH; and the user equipment, when configuring the user equipment to identify the second PDCCH transmitted from the base station, is set to configure the user equipment to identify the second PDCCH based at least in part on the frequency information associated with the second PDCCH.

In a fifteenth aspect, alone or in combination with one or more of the first through fourteenth aspects, the PDSCH schedule information includes first PDSCH schedule information, and the user equipment is configured to identify, based at least in part on being configured to identify the second PDCCH, second PDSCH schedule information included in the second PDCCH transmitted from the base station, and identify, based at least in part on the second PDSCH schedule information, at least one of a SIB1 communication transmitted in another PDSCH, an OSI communication transmitted in the other PDSCH, or a paging communication transmitted in the other PDSCH.

In a sixteenth aspect, alone or in combination with one or more of the first through fifteenth aspects, the user equipment is configured to identify the first search space set included in the PDSCH received from the base station and, when configuring the user equipment to identify the second PDCCH transmitted from the base station, is configured to configure the user equipment to identify the second PDCCH based at least in part on a default aggregation level, one or more default PDCCH candidate locations, the aggregation level, and the one or more PDCCH candidate locations.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment, comprising:
   receiving, from a base station, a first search space set;
   identifying, based at least in part on the first search space set, physical downlink shared channel (PDSCH) schedule information included in a first physical downlink control channel (PDCCH) received from the base station;
   identifying, based at least in part on the PDSCH schedule information, a second search space set included in a PDSCH received from the base station,
      wherein the second search space set includes information identifying an aggregation level and one or more PDCCH candidate locations that are associated with the aggregation level; and
   configuring, based at least in part on the aggregation level and the one or more PDCCH candidate locations, the user equipment to identify a second PDCCH transmitted from the base station.

2. The method of claim 1, wherein the first PDCCH is identified based at least in part on:
   a default aggregation level associated with the first search space set, and
   one or more default PDCCH candidate locations associated with the default aggregation level.

3. The method of claim 1, wherein the aggregation level included in the second search space set comprises:
   a specific aggregation level, associated with the second search space set, that is explicitly specified by the base station; and
   wherein the one or more PDCCH candidate locations that are associated with the aggregation level comprise:
      one or more specific PDCCH candidate locations, associated with the specific aggregation level, that are explicitly specified by the base station.

4. The method of claim 1, wherein the second search space set is included in a radio resource configuration (RRC) communication transmitted in the PDSCH.

5. The method of claim 4, wherein the first search space set is included in master information block (MIB) communication; and
   wherein the second PDCCH is identified, in the RRC communication, by at least one of:
      a duplicate of the first search space set that is included in the MIB communication, or
      a reference to the first search space set that is included in the MIB communication.

6. The method of claim 5, wherein the reference to the first search space set comprises:
   a search space set identifier of 0.

7. The method of claim 5, wherein the duplicate of the first search space set comprises:
   an explicit configuration that is the same as an implicit configuration of the first search space set that is included in the MIB communication.

8. The method of claim 1, wherein the second search space set is included in a system information block 1 (SIB1) communication transmitted in the PDSCH.

9. The method of claim 8, wherein the first search space set is included in master information block (MIB) communication; and
   wherein the second PDCCH is identified, in the SIB1 communication, by at least one of:
      a duplicate of the first search space set that is included in the MIB communication, or
      a reference to the first search space set that is included in the MIB communication.

10. The method of claim 9, wherein the reference to the first search space set comprises:
   a search space set identifier of 0.

11. The method of claim 9, wherein the duplicate of the first search space set comprises:
an explicit configuration that is the same as an implicit configuration of the first search space set that is included in the MIB communication.

12. The method of claim 1, wherein the PDSCH schedule information comprises:
information identifying:
a first location, in the PDSCH, of a system information block 1 (SIB1) communication transmitted in the PDSCH,
a second location, in the PDSCH, of an other system information (OSI) communication transmitted in the PDSCH, and
a third location, in the PDSCH, of a paging communication transmitted in the PDSCH.

13. The method of claim 1, wherein the first search space set is included in master information block (MIB) communication included in a physical broadcast channel (PBCH).

14. The method of claim 1, further comprising:
receiving, from the base station, a control resource set (CORESET) associated with the first search space set,
wherein the CORESET includes information identifying frequency information associated with the first PDCCH, and
wherein identifying the PDSCH schedule information included in the first PDCCH comprises:
identifying the PDSCH schedule information based at least in part on the frequency information associated with the first PDCCH.

15. The method of claim 1, further comprising:
receiving, from the base station, a control resource set (CORESET) associated with the second search space set,
wherein the CORESET includes information identifying frequency information associated with the second PDCCH, and
wherein configuring the user equipment to identify the second PDCCH transmitted from the base station comprises:
configuring the user equipment to identify the second PDCCH based at least in part on the frequency information associated with the second PDCCH.

16. The method of claim 1, wherein the PDSCH schedule information includes first PDSCH schedule information;
wherein the method further comprises:
identifying, based at least in part on being configured to identify the second PDCCH, second PDSCH schedule information included in the second PDCCH transmitted from the base station; and
identifying, based at least in part on the second PDSCH schedule information, at least one of:
a system information block 1 (SIB1) communication transmitted in another PDSCH,
an other system information (OSI) communication transmitted in the other PDSCH, or
a paging communication transmitted in the other PDSCH.

17. The method of claim 1, further comprising:
identifying the first search space set included in the PDSCH received from the base station,
wherein configuring the user equipment to identify the second PDCCH transmitted from the base station comprises:
configuring the user equipment to identify the second PDCCH based at least in part on:

a default aggregation level,
one or more default PDCCH candidate locations,
the aggregation level, and
the one or more PDCCH candidate locations.

18. A user equipment for wireless communication, comprising:
a memory; and
one or more processors operatively coupled to the memory, the memory and the one or more processors configured to:
receive, from a base station, a first search space set;
identify, based at least in part on the first search space set, physical downlink shared channel (PDSCH) schedule information included in a first physical downlink control channel (PDCCH) received from the base station;
identify, based at least in part on the PDSCH schedule information, a second search space set included in a PDSCH received from the base station,
wherein the second search space set includes information identifying an aggregation level and one or more PDCCH candidate locations that are associated with the aggregation level; and
configure, based at least in part on the aggregation level and the one or more PDCCH candidate locations, the user equipment to identify a second PDCCH transmitted from the base station.

19. The user equipment of claim 18, wherein the first PDCCH is identified based at least in part on:
a default aggregation level associated with the first search space set, and
one or more default PDCCH candidate locations associated with the default aggregation level.

20. The user equipment of claim 18, wherein the aggregation level included in the second search space set comprises:
a specific aggregation level, associated with the second search space set, that is explicitly specified by the base station; and
wherein the one or more PDCCH candidate locations that are associated with the aggregation level comprise:
one or more specific PDCCH candidate locations, associated with the specific aggregation level, that are explicitly specified by the base station.

21. The user equipment of claim 18, wherein the second search space set is included in a radio resource configuration (RRC) communication transmitted in the PDSCH.

22. The user equipment of claim 21, wherein the first search space set is included in master information block (MIB) communication; and
wherein the second PDCCH is identified, in the RRC communication, by at least one of:
a duplicate of the first search space set that is included in the MIB communication, or
a reference to the first search space set that is included in the MIB communication.

23. The user equipment of claim 22, wherein the reference to the first search space set comprises:
a search space set identifier of 0.

24. A non-transitory computer-readable medium storing one or more instructions for wireless communication, the one or more instructions comprising:
one or more instructions that, when executed by one or more processors of a user equipment, cause the one or more processors to:
receive, from a base station, a first search space set;

identify, based at least in part on the first search space set, physical downlink shared channel (PDSCH) schedule information included in a first physical downlink control channel (PDCCH) received from the base station;

identify, based at least in part on the PDSCH schedule information, a second search space set included in a PDSCH received from the base station, wherein the second search space set includes information identifying an aggregation level and one or more PDCCH candidate locations that are associated with the aggregation level; and configure, based at least in part on the aggregation level and the one or more PDCCH candidate locations, the user equipment to identify a second PDCCH transmitted from the base station.

25. The non-transitory computer-readable medium of claim 24, wherein the first PDCCH is identified based at least in part on:

a default aggregation level associated with the first search space set, and one or more default PDCCH candidate locations associated with the default aggregation level.

26. The non-transitory computer-readable medium of claim 24, wherein the aggregation level included in the second search space set comprises:

a specific aggregation level, associated with the second search space set, that is explicitly specified by the base station; and wherein the one or more PDCCH candidate locations that are associated with the aggregation level comprise:

one or more specific PDCCH candidate locations, associated with the specific aggregation level, that are explicitly specified by the base station.

27. The non-transitory computer-readable medium of claim 24, wherein the second search space set is included in a radio resource configuration (RRC) communication transmitted in the PDSCH.

28. An apparatus for wireless communication, comprising:

means for receiving, from a base station, a first search space set;

means for identifying, based at least in part on the first search space set, physical downlink shared channel (PDSCH) schedule information included in a first physical downlink control channel (PDCCH) received from the base station;

means for identifying, based at least in part on the PDSCH schedule information, a second search space set included in a PDSCH received from the base station, wherein the second search space set includes information identifying an aggregation level and one or more PDCCH candidate locations that are associated with the aggregation level; and means for configuring, based at least in part on the aggregation level and the one or more PDCCH candidate locations, the apparatus to identify a second PDCCH transmitted from the base station.

29. The apparatus of claim 28, wherein the first PDCCH is identified based at least in part on:

a default aggregation level associated with the first search space set, and one or more default PDCCH candidate locations associated with the default aggregation level.

30. The apparatus of claim 28, wherein the aggregation level included in the second search space set comprises:

a specific aggregation level, associated with the second search space set, that is explicitly specified by the base station; and wherein the one or more PDCCH candidate locations that are associated with the aggregation level comprise:

one or more specific PDCCH candidate locations, associated with the specific aggregation level, that are explicitly specified by the base station.

* * * * *